(No Model.)

W. HALKYARD.
ELECTRIC WIRE.

No. 284,959. Patented Sept. 11, 1883.

WITNESSES:
JJBorns
C. H. Luther Jr

INVENTOR:
William Halkyard
by Joseph A. Miller & Co
Atty's

UNITED STATES PATENT OFFICE.

WILLIAM HALKYARD, OF PROVIDENCE, RHODE ISLAND, ASSIGNOR OF ONE-HALF TO HENRY A. CHURCH, OF SAME PLACE.

ELECTRIC WIRE.

SPECIFICATION forming part of Letters Patent No. 284,959, dated September 11, 1883.

Application filed April 7, 1883. (No model.)

*To all whom it may concern:*

Be it known that I, WILLIAM HALKYARD, of the city and county of Providence, and State of Rhode Island, have invented a new and useful Improvement in Electric Wires; and I hereby declare the following to be a full, clear, and exact description of the same, reference being had to the accompanying drawings, forming part of this specification.

This invention has reference to an improvement in insulated wire for electrical purposes, in which the insulating material is protected by a metal armor; and it consists in the peculiar and novel construction of the armor, by which a strip of metal wider than the insulated wire or cable is placed around the same, so as to lap, having a longitudinal seam lengthwise with the wire, as will be more fully set forth hereinafter.

Figure 1:
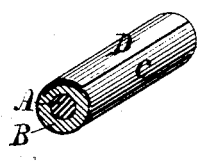
Figure 2:
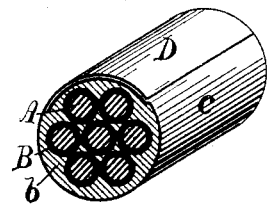
Figure 3:
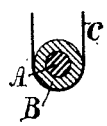
Figure 4:
Figure 5:

Figure 1 is a perspective view of an insulated wire covered with a sheet-metal casing or armor. Fig. 2 is a perspective view of a number of insulated wires formed into a cable protected by a sheet-metal armor. Fig. 3 is a sectional view of an insulated wire and a sheet-metal strip partly bent around the same. Fig. 4 is a sectional view of an insulated wire partly inclosed in a sheet-metal armor, and Fig. 5 is a sectional view of an insulated wire protected by a sheet-metal armor.

The invention relates to an electric wire having a protecting armor or covering, which is made from a strip or ribbon of metal, extending lengthwise of the wire and having the edges of said ribbon lapped.

In the drawings, A is an electric wire. B is an insulating-covering. C is the metal strip, made wider than the circumference of the insulated wire, so as to form the lap D. The sheet C is formed into a trough, in which the wire is placed, as is shown in Fig. 3. One side of the sheet is now placed around the wire, as is shown in Fig. 4, when the other side of the sheet is formed over the same, as shown in Fig. 5, making the lap D, inclosing the whole wire and protecting the insulating material, at the same time adding the tensile strength of the sheet covering to the tensile strength of the wire. I prefer to secure the lapped edge with solder, as this firmly secures the same and allows the so-sheeted wire to be bent freely without opening the lapped seam. It will be readily understood that the sheet C and lap D are on a line with the axis of the wire, and particularly, when soldered, does the lap materially increase the tensile strength of the compound wire, so that a very light wire of high conductive power may be used for the central wire, and the sheeting made of a metal of considerable tensile strength, depending on its strength mainly for supporting the wire, while the reverse may also be done by using a strong wire and a light sheet-metal casing. Where the covering C is lapped—that is, where one edge of said covering extends past the other—the interior layer of the lapped portion is offset or sunk into the insulating material, so that the external portion of the completed wire is smooth or circular.

Electric wires may be thus covered in a simple machine at considerable speed and at small cost. One method for so covering the wire I have described in the Patent No. 253,529, granted February 14, 1882, and to which reference is made; but other means and methods may be used to so cover the insulated wire, one of which is described in an application for a patent filed of even date with this application.

When a cable is to be protected by a sheet-metal armor, I group the wires into nearly a circle and cover the whole with the insulating material *b'*, so as to form a cylinder, and around this I place the sheet, lapping the same at one side and preferably securing the lapped edge with solder.

By reason of the offset in the covering-strip, into which offset the external lapped edge extends, the surface of the wire is cylindrical, and the edge of the covering-strip is protected from catching when the wire is drawn over a bracket. The wire also presents a more finished appearance.

By reason of the lap, especially when the lap is soldered, a very considerable strength and rigidity is given to the wire.

I do not claim, broadly, all forms of insulated wire covered by a ribbon of metal. Wires resembling mine in many respects are shown in English Patents No. 906 of 1853 and in No. 778 of 1852. I claim only as hereinafter stated.

Having thus described my invention, I claim as new and desire to secure by Letters Patent—

1. The improved electric wire or cable consisting of a number of insulated wires, a layer of insulating material surrounding the same, and the external covering of sheet metal, the edges of said sheet metal being lapped and soldered and the lap-joint extending longitudinally of the wire or cable, as set forth.

2. The improved electric wire or cable consisting of a number of wires insulated from each other, a layer of insulating material, and a metallic covering consisting of a sheet of metal having its edges lapped and soldered, as described, and having the lapped portion offset, so that the exterior of the covering shall be cylindrical, substantially as shown and set forth.

WILLIAM HALKYARD.

Witnesses:
M. F. BLIGH,
J. A. MILLER, Jr.